Nov. 13, 1962 MASAO HAYASHI 3,063,684
MIXER
Filed Nov. 20, 1959 2 Sheets-Sheet 1

INVENTOR.
Masao Hayashi
BY
Mason, Fenwick & Lawrence
Attorneys

INVENTOR.
Masao Hayashi

United States Patent Office 3,063,684
Patented Nov. 13, 1962

3,063,684
MIXER
Masao Hayashi, 380 Schimura Motohasunumacho
Itabashiku, Tokyo, Japan
Filed Nov. 20, 1959, Ser. No. 854,498
4 Claims. (Cl. 259—102)

The present invention relates to a mixer, particularly to a cream or butter mixer, which is provided with a cleaner.

The object of the present invention is to provide a mixer wherein a cleaner can be moved from the non-operating position to the operating position and vice versa at any time without stopping the rotation of the agitator in cream or butter agitating and which is very simple to handle and remarkably high in efficiency of cream or butter agitating.

According to the present invention a mixer comprises a frame with a driving means, a vessel carried on said frame, a rotary disc turnably supported on said frame, an agitator turnably mounted on said disc through a rotary shaft so as to rotatably revolve together with said disc, a cleaner swingably supported on said disc and moved by a rod passing through a center portion of said disc, said rod operated at the outside of said frame so as to contact said cleaner with the inner surface of said vessel.

The present invention is more fully described hereinbelow with reference to the accompanying drawings in which.

Figure 1:
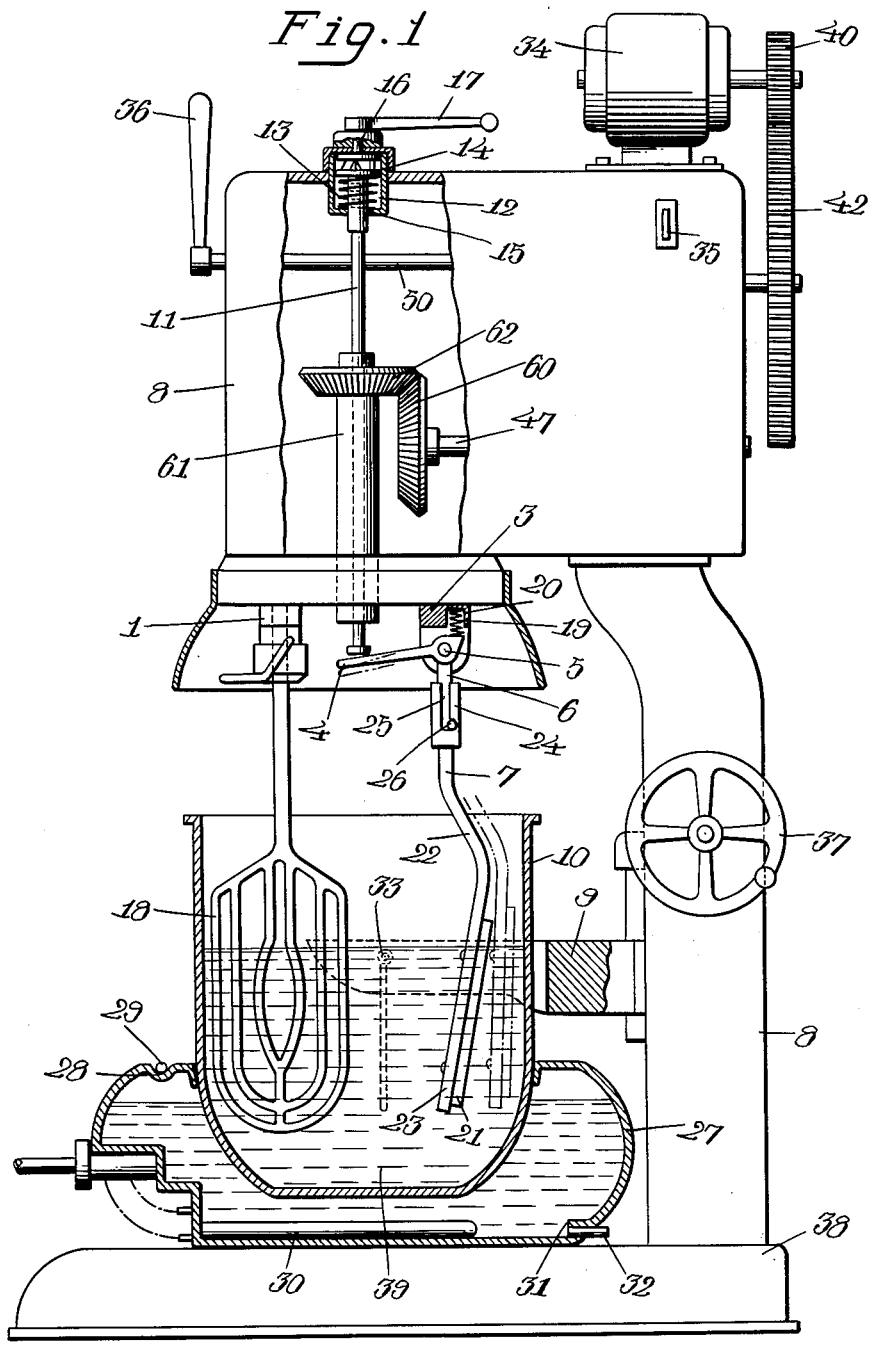
FIGURE 1 is an elevation, partly in section, of the mixer according to the present invention.
Figure 2:
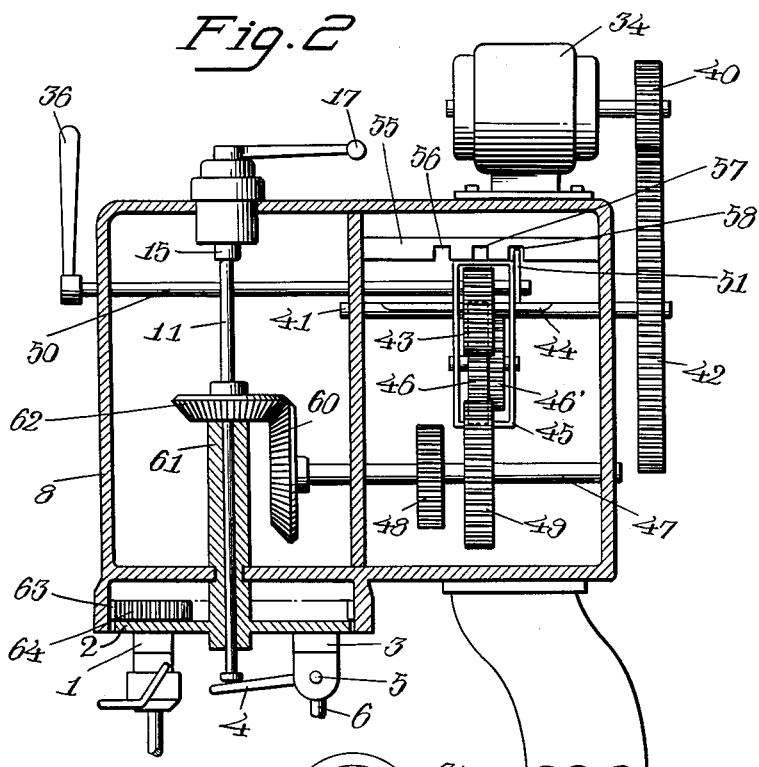
FIGURE 2 is an elevation of a transmission gear mechanism of the mixer.
Figure 3:
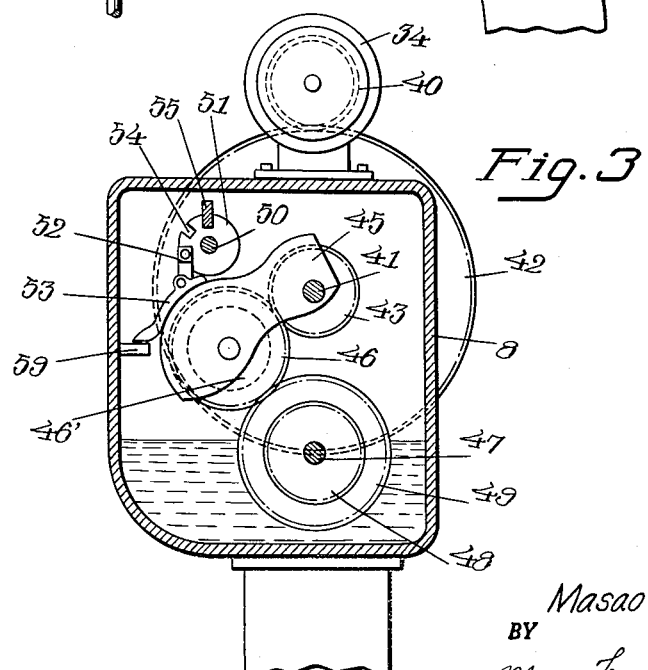
FIGURE 3 is a sectional side elevation taken along the line III—III in FIGURE 2.

Referring to FIGURE 1, 1 designates a rotary shaft connected with an agitator and turnably mounted on a rotary disc 2. On said disc is provided a supporting part 3 for said shaft 1. A cleaner carrying lever 4 is resiliently and turnably pivoted at 5 on said supporting part 3 so that a cleaner 7 removably fitted to a cleaner fitting part 6 under the pivoting part 5 of said lever 4 is adapted to be displaced to an operating position adjacent to the inner peripheral surface of a vessel 10 mounted on a supporting part 9 of a frame 8 or to a non-operating position far from the inner peripheral surface of the vessel 10. A vertically movable rod 11 inserted loosely in the frame 8 is connected at the lower end to the free end of said lever 4. A hollow chamber 12 is provided in the top of the frame 8, in which a spiral spring 13 is set and on said spiral spring 13 is mounted a driven clutch part 14, the lower end of which is in contact with the upper end of said rod 11 through a through hole 15 provided in the bottom of said hollow chamber 12. A driving clutch part 16 is contained in the hollow chamber 12 and is engaged with said driven clutch part 14. A rotating handle 17 is attached to said driving clutch part 16.

18 is a cream or butter agitator attached to the rotary shaft 1 therefor. 19 is a spiral spring fitted in a recess 20 in the rotary disc 2. The lower end of said spring 19 is resiliently in contact with the upper surface adjacent to the pivoting part 5 of the cleaner carrying lever 4. 21 is a cream or butter wiping rubber strip attached to an inclined rod 23 formed in the lower end of a curved rod 22 in the cleaner 7. 24 is a tubular part formed in the upper part of the curved rod 22 in the cleaner 7. An L-shaped cut portion 25 is made in said tubular part. The cleaner 7 is fitted to the cleaner fitting part 6 by fitting the L-shaped cut portion 25 made in the tubular part 24 of the cleaner 7 to a projection 26 in the cleaner fitting part 6. 27 is a hot water bath. 28 is a recess made in the upper outer surface of the hot water bath 27. 29 is a thermometer in the recess 28. 30 is an electric heater. 31 is a drain port. 32 is a plug. 33 is a fixture for the hot water bath 27 to the supporting part 9 for mounting vessel. 34 is an electric motor. 35 is a switch for the motor 34. 36 is a speed regulating handle for the rotary shaft 1. 37 is a handle for elevating and lowering the vessel mounting supporting part 9. 38 is a machine base. 39 is a cream or butter material.

The transmission gear mechanism for operatively connecting the agitator fitting rotary shaft 1 with the motor 34 will now be explained. 40 is a gear on the shaft of motor 34. 41 is an upper shaft mounted horizontally within the frame. 42 is a gear on the end of the upper shaft 41 projecting out of the frame, said gear 42 being meshed with the gear 40 on the shaft of the motor 34. 43 is a speed-change gear sliding along a key way 44 in the upper shaft 41 and rotating together with the upper shaft 41. 45 is a rotary housing covering a part of the speed-change gear 43 and fitted loosely on the upper shaft 41. 46 and 46' are two-speed change gears supported within the rotary housing 45, one gear 46 of them being meshed with the speed-change gear 43. 47 is a lower shaft mounted horizontally within the frame. 48 and 49 are speed-change gears mounted on the lower shaft 47, said two speed-change gears 46 and 46' are detachably meshed with these gears 48 and 49. 50 is a clutch shaft mounted horizontally in the frame. 51 is a clutch provided on the clutch shaft. 52 is a connecting piece connecting loosely the clutch 51 with a projecting piece 53 on the rotary housing 45. 54 is a cut part in the clutch 51. 55 is a clutch guide rod provided horizontally within the frame. 56, 57 and 58 are cut parts on the lower surface of the clutch guide rod 55. 59 is a clutch receiving part within the frame. 60 is a bevel gear provided in the end of the lower shaft 47. 61 is a tubular shaft provided rotatably and vertically within the frame. 62 is a bevel gear fixed to the upper end of said tubular shaft 61, the bevel gear 62 being meshed with said bevel gear 60. 63 is an internal ring gear fixedly supported on the inner circumferential surface of the depending portion of the frame 8 which surrounds the disc 2, and is disposed around the circumference of and within the rotary disc 2 provided in the lower end of the tubular shaft 61. 64 is a pinion gear disposed within the rotary disc 2 and meshed with the internal ring gear 63, the shaft of said pinion gear 64 being provided as suspended down through the rotary disc 2 so as to be the rotary shaft 1 for fitting the agitator 18. Said transmission gear mechanism is constructed as described above.

The rotation of the gear 60 rotates bevel gear 62, which in turn rotates the tubular shaft 61, and therefore the rotary disc 2. Rotation of the disc 2 will rotate the pinion gear 64 by means of the ring gear 63, which is integral with the rotary disc 2. The agitator 18, being connected to the gear 64, is therefore rotated within the vessel 10.

When it is wanted to change and regulate the rotating speed of the rotary shaft 1 of the agitator 18, for example, to the rotating speed of any one of the three determined steps, if the speed regulating handle 36 in the outer end of the clutch shaft 50 is gripped and is rotated clockwise, the clutch 51 which has so far engaged with the cut part 58 in the lower surface of the clutch guide rod 55 will rotate and will bring the cut part 54 of the clutch 51 to the cut part 53 of the clutch guide rod 55 and at the same time the speed-change gear 46 which has so far meshed with the speed-change gear 49 will move up and will disengage from said gear 49. Then the rotary housing 45 connected through the connecting piece 52 to the clutch 51 which will slide leftward along the clutch guide rod 55 and the speed-change gears 46, 46' and 43 will also slide leftward together along the upper shaft 41.

After the cut part 54 of the clutch 51 is brought to and made to coincide with the cut part 57 or 56 in the lower surface of the clutch guide rod 55, when the speed regulating handle 36 is rotated now anticlockwise opposite to the above, the rotary housing 45 and the gears 46 and 46' will move down due to their own weights and the speed-change gear 46' will mesh with the speed-change gear 49 or the speed-change gear 46 will mesh with the speed-change gear 48.

Therefore, the agitator 18 rotated by the rotation from the motor 34 will rotate to be regulated by the rotating speed of any one of the three determined steps.

The operation of the present invention will be now explained in the following. First of all, the cleaner 7 in the present invention is placed in the non-operating position far from the inner peripheral surface of the vessel 10 mounted on the supporting part 9 for mounting the vessel. After the cream or butter material 39 is put into the vessel, when the motor 34 is started by closing the switch 35 thereof, the cream or butter agitator 18 fitted to the lower end of the rotary shaft 1 operatively connected with the motor 34 through the transmission gear mechanism will rotate and will at the same time revolve approaching the inner peripheral surface of the vessel 10 so as to agitate the cream or butter material 39 contained in the vessel 10. As the agitation gradually proceeds, the cream or butter material 39 contained in the vessel 10 will be well agitated, at the same time will be increased in volume, will adhere to the inner peripheral surface of the vessel 10 and will increase the thickness of the layer until it overflows the vessel. Then, if the rotating handle 17 is gripped and is rotated clockwise, the driving clutch part 16 connected to the rotating handle 17 will rotate and said driving clutch part 16 which has so far engaged with the driven clutch part 14 will be disengaged and the ridge parts of the teeth in the driving clutch part 16 will mount on the ridge parts of the teeth in the driven clutch part 14. At that time, the driven clutch part 14 will be pressed downward against the resiliency of the spiral spring 13 and therefore the rod 11 in contact with the lower surface of the driven clutch part 14 will be moved down. Thus, the cleaner carrying lever 4 connected with said rod 11 will be rotated anticlockwise around the pivoting part 5 as a center against the resiliency of the spiral spring 19. Therefore, the cleaner 7 fitted to the cleaner fitting part 6 of the cleaner carrying lever 4 will rotate anticlockwise around the pivoting part 5 as a center and will be moved from the non-operating position far from the inner peripheral surface of the vessel 10 into the operating position adjacent to said inner peripheral surface of the vessel. Then, the thick layer of cream or butter adhering to the inner peripheral surface part of the vessel 10 will be immediately wiped off into the vessel by the cleaner 7 and at the same time the cream or butter adhering to the inner peripheral surface of the vessel 10 will be constantly wiped off. Therefore, no cream or butter will adhere to the inner peripheral surface of the vessel 10 at all and said inner peripheral surface of the vessel will be kept clean.

When it is no longer necessary to retain the cleaner 7 in the operating position during or after the agitation, if the rotating handle 17 is gripped and is rotated anticlockwise opposite to the above, the ridge parts of the teeth in the driving clutch part 16 connected to the rotating handle 17 will fall down from the ridge parts of the teeth in the driven clutch part 14 on which they have so far mounted and will engage with those in the driven clutch part 14. Thus, the driven clutch part 14 will be moved up by the resiliency of the spiral spring 13 and therefore the rod 11 which has so far been pressed by the lower surface of the driven clutch part 14 will be relieved of the pressed force. Therefore, the cleaner carrying lever 4 connected with the rod 11 will be rotated clockwise around the pivoting part 5 as a center by the resiliency of the spiral spring 19, so that the rod 11 will come into contact with the lower surface of the driven clutch part 14 while moving up. Thus, the cleaner 7 fitted to the cleaner fitting part 6 of the cleaner carrying lever 4 will rotate clockwise around the pivoting part 5 as a center, will move toward the center of the vessel 10 from the operating position adjacent to the inner peripheral surface part of the vessel and will be placed in the non-operating position away from the inner peripheral surface.

Thus, the rotation of the cream or butter agitator 18 which has so far been rotating within the vessel 10 and at the same time revolving along the inner peripheral surface of the vessel is stopped by opening the switch 35 of the motor 34. It is needless to say that, in agitating the cream or butter material 39, the vessel 10 is heated to any required temperature by hot water bath.

In the known conventional cream or butter mixer, as it is equipped with no cleaner, during the agitation, every time the well agitated cream or butter increases in volume, adheres to the inner peripheral surface of the vessel and increases the thickness of the layer until it overflows the vessel, the rotation of the agitator must be stopped opening the motor switch and stopping the rotation and then the adhering layer must be scraped down into the vessel, for example, by means of a spatula. Therefore, it is very troublesome and the cream or butter agitating efficiency is not high in such conventional mixer.

According to the present invention, the cleaner 7 will be placed in the operating position adjacent to the inner peripheral surface of the vessel 10 as described above and the cream or butter adhering to said inner peripheral surface will be able to be wiped off, since the cleaner 7 is set as described above, during the agitation of cream or butter, and the rotating handle 17 is gripped and is only rotated clockwise, when the cleaner 7 has become necessary. Then, when it has become unnecessary to use the cleaner 7, if the rotating handle 17 is gripped and is rotated anticlockwise opposite to clockwise in the above, the cleaner 7 will be able to be placed in the non-operating position far from the inner peripheral surface of the vessel 10 as described above.

What I claim is:

1. A mixer comprising, a frame, a vessel carried on said frame, a rotary disc turnably supported on said frame, driving means for rotating said disc, an agitator rotatably and eccentrically mounted on said disc and driven by said disc, a cleaner for sweeping the inside of said vessel mounted eccentrically on said disc separate from said agitator for pivotal movement relative to said disc towards and away from the sides of said vessel, means on said mixer for moving said cleaner into and out of contact with the side of said vessel and means non-rotatably mounted on said frame for actuating said last mentioned means.

2. The mixer of claim 1 wherein the non-rotatable means includes a rod mounted for vertical movement through said disc.

3. The mixer of claim 2 wherein said means on said mixer for moving said cleaner into and out of contact with the side of the vessel includes a lever means connected to said cleaner at one end and engageable with said rod at the other end whereby vertical movement of said rod operates said lever means to move said cleaner towards the side of said vessel.

4. The mixer of claim 3 wherein said lever means is mounted on said disc for movement with said disc and wherein biasing means mounted on said disc operatively engages said lever means to normally maintain said cleaner out of contact with said vessel until downward movement of said rod overrides said biasing means and urges said cleaner towards the side of said vessel.

References Cited in the file of this patent

UNITED STATES PATENTS

| | | |
|---|---|---|
| 1,468,615 | Guttenstein et al. | Sept. 18, 1923 |
| 1,747,443 | Johnston | Feb. 18, 1930 |
| 1,955,413 | Dell | Apr. 17, 1934 |
| 2,178,269 | Seybert | Oct. 31, 1939 |

FOREIGN PATENTS

| | | |
|---|---|---|
| 246,926 | Great Britain | Feb. 8, 1926 |